(12) United States Patent
Kim et al.

(10) Patent No.: US 11,509,453 B2
(45) Date of Patent: Nov. 22, 2022

(54) APPARATUS AND METHOD FOR DATA ANALYSIS

(71) Applicant: SAMSUNG SDS CO., LTD., Seoul (KR)

(72) Inventors: Eun Kyung Kim, Seoul (KR); Young Hyun Kim, Seoul (KR); Jin Hyuck Jeong, Seoul (KR); Duk Jae Moon, Seoul (KR); Hyo Jin Yoon, Seoul (KR); Jung Hoon Sohn, Seoul (KR); Ki Hyo Moon, Seoul (KR); Seung Hyun Kang, Seoul (KR); Seung Ro Joo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/884,889

(22) Filed: May 27, 2020

(65) Prior Publication Data
US 2021/0328764 A1 Oct. 21, 2021

(30) Foreign Application Priority Data

Apr. 21, 2020 (KR) .................. 10-2020-0048324

(51) Int. Cl.
*H04L 9/00* (2022.01)
*G06F 7/523* (2006.01)
*H04L 9/06* (2006.01)

(52) U.S. Cl.
CPC .............. *H04L 9/008* (2013.01); *G06F 7/523* (2013.01); *H04L 9/065* (2013.01)

(58) Field of Classification Search
CPC .......... H04L 9/008; H04L 9/065; G06F 7/523
See application file for complete search history.

(56) References Cited

U.S. PATENT DOCUMENTS

| | | | |
|---|---|---|---|
| 2018/0359078 A1 | 12/2018 | Jain et al. | |
| 2019/0036678 A1* | 1/2019 | Ahmed | ............... H04L 9/302 |
| 2019/0199509 A1* | 6/2019 | Hoshizuki | ............... G06N 3/063 |
| 2021/0083841 A1* | 3/2021 | Tueno | ............... G06F 40/126 |

FOREIGN PATENT DOCUMENTS

| | | |
|---|---|---|
| CN | 108718231 A | 10/2018 |
| KR | 10-1677114 B1 | 11/2016 |

OTHER PUBLICATIONS

European Search Report For EP20194760.3 dated Feb. 26, 2021 from European patent office in a counterpar European patent application.

* cited by examiner

*Primary Examiner* — Ashokkumar B Patel
*Assistant Examiner* — William B Jones
(74) *Attorney, Agent, or Firm* — The PL Law Group, PLLC (57) ABSTRACT

A method for data analysis according to an embodiment includes acquiring, from a client device, a ciphertext for a precomputation result generated by applying some of a plurality of operations for performing an analysis algorithm based on target data to the target data, and generating an encrypted computation result for remaining operations of the plurality of operations by using the ciphertext.

8 Claims, 8 Drawing Sheets

| Age |
|-----|
| 15 |
| 23 |
| 17 |
| 46 |
| 78 |
| 9 |
| 32 |

| Age_10 | Age_20 | Age_30 | Age_40 | Age_50 | ... | Age_100 |
|--------|--------|--------|--------|--------|-----|---------|
| 0 | 1 | 1 | 1 | 1 | ... | 1 |
| 0 | 0 | 1 | 1 | 1 | ... | 1 |
| 0 | 1 | 1 | 1 | 1 | ... | 1 |
| 0 | 0 | 0 | 0 | 1 | ... | 1 |
| 0 | 0 | 0 | 0 | 0 | ... | 1 |
| 1 | 1 | 1 | 1 | 1 | ... | 1 |
| 0 | 0 | 0 | 1 | 1 | ... | 1 |

APPARATUS AND METHOD FOR DATA ANALYSIS

CROSS REFERENCE TO RELATED APPLICATIONS AND CLAIM OF PRIORITY

This application claims the benefit of Korean Patent Application No. 10-2020-0048324 filed on Apr. 21, 2020 in the Korean Intellectual Property Office, the disclosure of which is incorporated herein by reference in its entirety.

TECHNICAL FIELD

The disclosed embodiments relate to data analysis technology using homomorphic encryption.

BACKGROUND ART OF THE INVENTION

Homomorphic encryption supports basic homomorphic operations of addition and multiplication on a message in an encrypted state and allows other complex computations to take place by combining two basic operations and performing various computation algorithms in an encrypted state. However, if the multiplication operation is repeatedly performed, at some point, a ciphertext is turned into a form that is no longer suitable for a homomorphic operation. Therefore, in order to perform an arbitrary calculation, it is necessary to repeatedly perform a bootstrapping operation that keeps the ciphertext in a state in which an operation can be performed, and such an operation significantly increases the execution time of the analysis algorithm using homomorphic encryption.

SUMMARY

The disclosed embodiments are intended to provide an apparatus and method for data analysis.

A method for data analysis according to one embodiment includes acquiring, from a client device, a ciphertext for a precomputation result generated by applying some of a plurality of operations for performing an analysis algorithm based on target data to the target data; and generating an encrypted computation result for remaining operations of the plurality of operations by using the ciphertext.

The ciphertext for the precomputation result may be a ciphertext encrypted using a homomorphic encryption algorithm.

The generating may include generating the encrypted computation result by performing a homomorphic operation for the remaining operations using the ciphertext.

The analysis algorithm may include a plurality of sub-algorithms each including one or more operations among the plurality of operations, the precomputation result may be generated by dividing the target data into a plurality of parts and then performing some of the plurality of sub-algorithms on one or more of the plurality of parts, and the encrypted computation result may be a ciphertext for a result of performing remaining sub-algorithms of the plurality of sub-algorithms using the ciphertext.

The some of the plurality of operations may include at least one of a multiplication operation and a comparison operation based on the target data.

An apparatus for data analysis according to one embodiment includes a ciphertext acquirer configured to acquire, from a client device, a ciphertext for a precomputation result generated by applying some of a plurality of operations for performing an analysis algorithm based on target data to the target data; and a computation unit configured to generate an encrypted computation result for remaining operations of the plurality of operations by using the ciphertext.

The ciphertext for the precomputation result may be a ciphertext encrypted using a homomorphic encryption algorithm.

The computation unit may generate the encrypted computation result by performing a homomorphic operation for the remaining operations using the ciphertext.

The analysis algorithm may include a plurality of sub-algorithms each including one or more operations among the plurality of operations, the precomputation result may be generated by dividing the target data into a plurality of parts and then performing some of the plurality of sub-algorithms on one or more of the plurality of parts, and the encrypted computation result may be a ciphertext for a result of performing remaining sub-algorithms of the plurality of sub-algorithms using the ciphertext.

The some of the plurality of operations may include at least one of a multiplication operation and a comparison operation based on the target data.

According to the disclosed embodiments, some of a plurality of operations for performing an analysis algorithm are performed on a client device, then a ciphertext for a result of performing the operations is provided, and an encrypted computation result for the remaining operations of the plurality of operations is generated using the ciphertext provided from the client device, thereby protecting the confidentiality of the target data and at the same time increasing the efficiency of the operation for performing the analysis algorithm.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
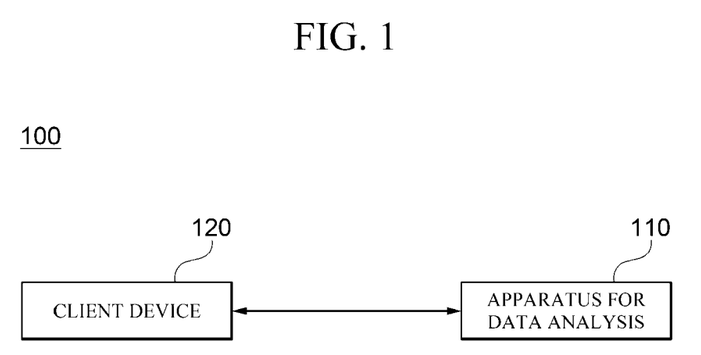
FIG. 1 is a diagram illustrating a data analysis system according to one embodiment.

FIG. 1 is a diagram illustrating a data analysis system according to one embodiment.

Referring to FIG. 1, the analysis system 100 according to one embodiment includes an apparatus 110 for data analysis and a client device 120.

The apparatus 110 for data analysis is an apparatus for generating a result of performing an analysis algorithm based on target data without exposing the target data. According to one embodiment, the analysis algorithm may be a data analysis algorithm for performing data analysis, such as predictive analysis, statistical analysis, classification, clustering, and the like, on the basis of target data.

According to another embodiment, the analysis algorithm may be a machine learning algorithm for training an analysis model for data analysis using the target data as training data.

Meanwhile, the analysis algorithm is not necessarily limited to the above-described examples, and may be various types of algorithms that can be performed through a plurality of operations based on target data.

The target data may mean data to be used as an independent variable for data analysis or training data for machine learning. In addition, according to one embodiment, the target data may be data that is prohibited from being disclosed to a third party who is not lawfully authorized, or data that is required to be undisclosed for the protection of personal privacy or according to security needs.

For example, the target data may be genetic data, medical record data, financial transaction information data (e.g., account number, account deposit and withdrawal history, and the like), personal information data (e.g., name, social security number, and the like), and yet various types of data may be used as target data in addition to the above-described examples according to the type of the analysis algorithm, the purpose of analysis using the analysis algorithm, and the like.

The client device 120 is a device that owns the target data. In this case, the client device 120 that owns the target data may include the client device 120 that stores the target data in an internal storage medium or the client device 120 that can acquire the target data by accessing an external device which stores the target data.

Meanwhile, in the example illustrated in FIG. 1, it is illustrated there is one client device 120, but the client device 120 may be provided in plural according to an embodiment.

Figure 2:
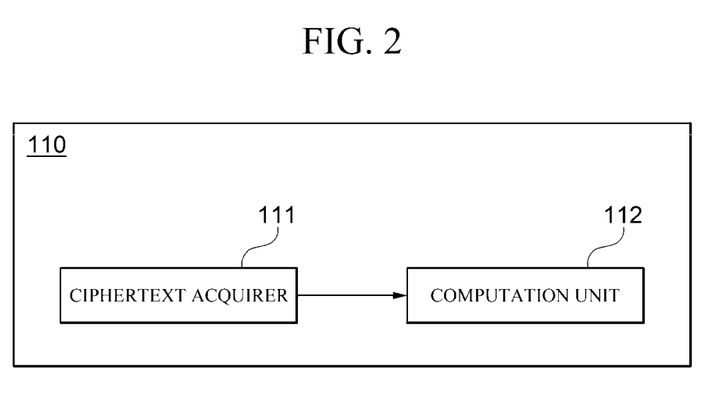
FIG. 2 is a diagram illustrating a configuration of an apparatus for data analysis according to one embodiment.

FIG. 2 is a diagram illustrating a configuration of an apparatus for data analysis according to one embodiment.

Referring to FIG. 2, the apparatus 110 for data analysis according to one embodiment includes a ciphertext acquirer 111 and a computation unit 112.

The ciphertext acquirer 111 acquires, from the client device 120, a ciphertext for a precomputation result generated by applying some of a plurality of operations for performing an analysis algorithm based on target data to the target data.

Specifically, the analysis algorithm may include a plurality of operations which are performed simultaneously or sequentially on the basis of the target data, and the ciphertext received from the client device 120 may be a ciphertext acquired by encrypting the result of performing some of the plurality of operations on the basis of the target data.

In this case, according to one embodiment, the plurality of operations may include, for example, arithmetic operations, size comparison operations, polynomial operations, and the like, and the operation performed by the client device 120 may include at least one of multiplication operations and comparison operations. Meanwhile, the types of operations for performing the analysis algorithm are not necessarily limited to the above-described examples, and may vary depending on the analysis algorithm.

Meanwhile, according to one embodiment, the analysis algorithm may include a plurality of sub-algorithms each including one or more of a plurality of operations for performing the analysis algorithm, and the ciphertext received from the client device 120 may be a ciphertext obtained by encrypting the result of performing some of the plurality of sub-algorithms on the basis of the target data.

In addition, according to one embodiment, the ciphertext received from the client device 120 may be a ciphertext obtained by dividing the target data into a plurality of parts and encrypting the result of performing some of the plurality of sub-algorithms on one or more of the plurality of divided parts. Specifically, the client device 120 may perform the same or different sub-algorithms on each of the plurality of divided parts, and may not perform any sub-algorithm on some of the plurality of parts according to an embodiment.

Meanwhile, according to one embodiment, the ciphertext received from the client device 120 may be a ciphertext encrypted using a homomorphic encryption algorithm.

In this case, it is sufficient that the homomorphic encryption algorithm supports homomorphic operations for the remaining operations of the plurality of operations for performing the analysis algorithm, other than the operations performed by the client device, and the homomorphic encryption algorithm is not necessarily limited to a specific algorithm.

Meanwhile, when the homomorphic encryption algorithm supports a homomorphic operation for a specific operation, it may mean that a ciphertext for the result of applying a specific operation on a plaintext of the ciphertext can be generated by performing an operation on the ciphertext, which is encrypted using the homomorphic encryption algorithm, in an encrypted state. Specifically, a homomorphic operation $\boxplus$ for addition, a homomorphic operation $\boxdot$ for multiplication, and a homomorphic operation $\boxed{f}$ for function f may, respectively, satisfy Equations 1 to 3 below.

$$\text{Enc}(x_1) \boxplus \text{Enc}(x_2) \rightarrow \text{Enc}(x_1 + x_2) \qquad \text{[Equation 1]}$$

$$\text{Enc}(x_1) \boxdot \text{Enc}(x_2) \rightarrow \text{Enc}(x_1 \cdot x_2) \qquad \text{[Equation 2]}$$

$$\boxed{f}(\text{Enc}(x)) \rightarrow \text{Enc}(f(x)) \qquad \text{[Equation 3]}$$

The computation unit 112 may use the ciphertext acquired from the client device 120 to generate an encrypted computation result for the remaining operations of the plurality of operations for performing the analysis algorithm based on the target data.

Specifically, the computation unit 112 may use the ciphertext received from the client device 120 in an encrypted state to generate a ciphertext for the result of applying the remaining operations to a plaintext for the received ciphertext. That is, the computation unit 112 may generate the encrypted calculation result for the remaining operations by performing the homomorphic operation for the remaining operations using the homomorphic encryption algorithm that is used by the client device 120 for encryption.

Meanwhile, according to one embodiment, as described above, when the analysis algorithm includes a plurality of sub-algorithms each including one or more operations and the ciphertext received from the client device 120 is a ciphertext generated by encrypting the result of performing some of the plurality of sub-algorithms, the computation unit 112 may generate the ciphertext for the result of performing the remaining sub-algorithms of the plurality of sub-algorithms through the homomorphic operation using the received ciphertext.

Figure 3:
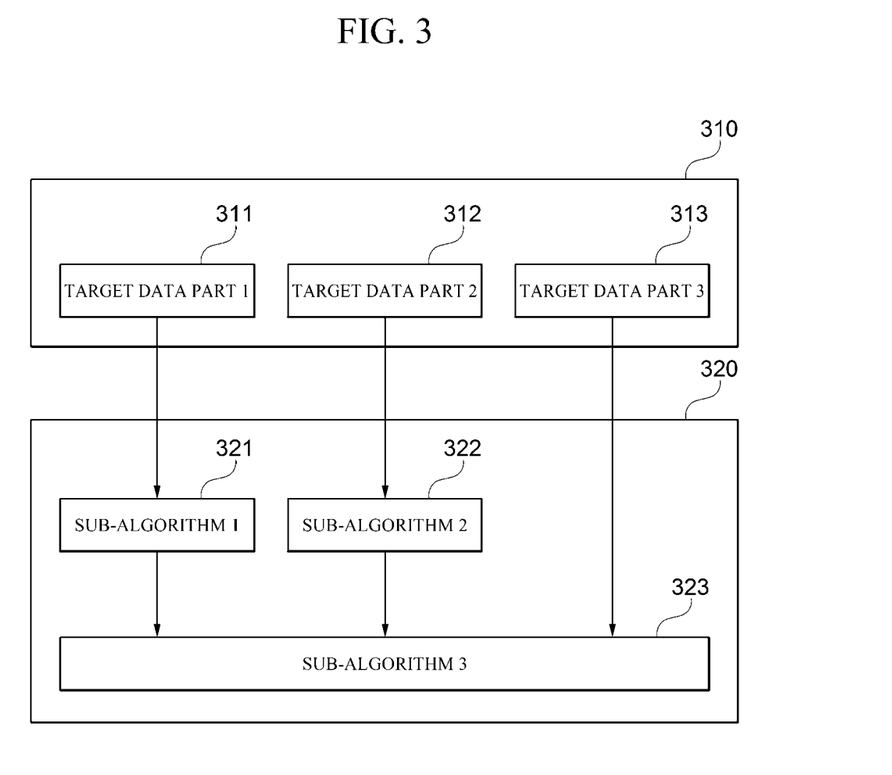
FIG. 3 is a diagram illustrating an example of a plurality of sub-algorithms included in an analysis algorithm according to one embodiment.

FIG. 3 is a diagram illustrating an example of a plurality of sub-algorithms included in an analysis algorithm according to one embodiment.

In the example shown in FIG. 3, target data 310 is divided into three parts 311, 312, and 313, and an analysis algorithm 320 includes three sub-algorithms 321, 322, and 323.

Sub-algorithm 1 321 and sub-algorithm 2 322 are configured to be performed, respectively, using part 1 311 and part 2 312 of the target data as input data, and sub-algorithm 3 323 is configured to be performed using the results of performing each of the sub-algorithm 1 321 and the sub-algorithm 2 322 and part 3 313 of the target data as input data.

For example, the sub-algorithm 1 321 and the sub-algorithm 2 322 may be performed by the client device 120. In this case, the ciphertext acquirer 111 may receive a ciphertext for the result of performing each of the sub-algorithm 1 321 and the sub-algorithm 2 322 and the target data part 3 313 from the client device 120, and generate an encrypted result of performing the sub-algorithm 3 323 through a homomorphic operation using the received ciphertext.

In another example, the sub-algorithm 1 321 may be performed by the client device 120. In this case, the ciphertext acquirer 111 may receive a ciphertext for the result of performing the sub-algorithm 1 321 and the part 2 312 and the part 3 313 of the target data, and the computation unit 112 may generate an encrypted result of performing the sub-algorithm 2 322 and the sub-algorithm 3 323 through a homomorphic operation using the received ciphertext.

On the other hand, in the example shown in FIG. 3, it is illustrated that the target data is divided into the three parts 311, 312, and 313, and the analysis algorithm includes the three sub-algorithms 321, 322, and 323, but the number of sub-algorithms included in the analysis algorithm may vary according to an embodiment, and the number of parts divided from the target data and the division criteria may vary depending on the type of the sub-algorithm to be performed by the client device 120, the nature of the target data, and the like.

In addition, among the plurality of sub-algorithms included in the analysis algorithm, the sub-algorithm to be performed by the client device 120 and the sub-algorithm to be performed by the apparatus 110 for data analysis may be predetermined in consideration of the efficiency of the homomorphic operation using the homomorphic encryption algorithm, and may vary according to an embodiment.

Figure 4:
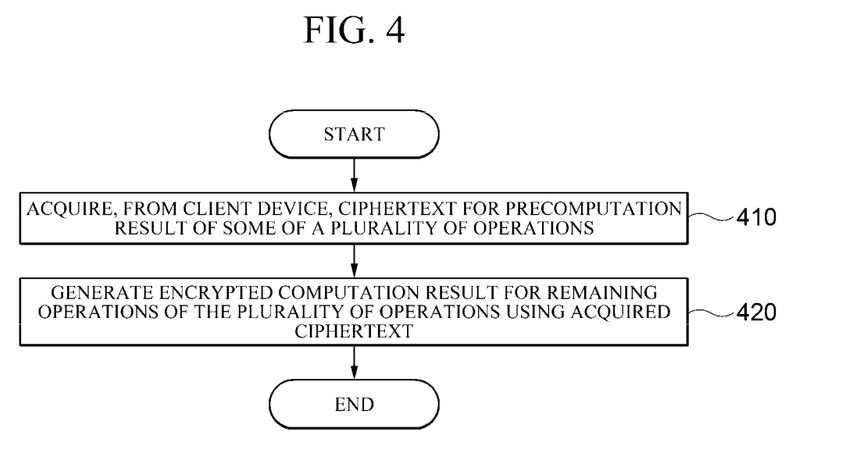
FIG. 4 is a flowchart illustrating a method of data analysis according to one embodiment.

FIG. 4 is a flowchart illustrating a method of data analysis according to one embodiment.

The method illustrated in FIG. 4 may be performed by, for example, the apparatus 110 for data analysis illustrated in FIG. 2.

Referring to FIG. 4, first, the apparatus 110 for data analysis acquires a ciphertext for a precomputation result by applying some of a plurality of operations for performing an analysis algorithm based on target data to the target data (410).

In this case, according to one embodiment, the analysis algorithm may include a plurality of sub-algorithms each including one or more of the plurality of operations, and the ciphertext received from the client device 120 may be a ciphertext for the result of performing some of the plurality of sub-algorithms using the target data.

Further, according to one embodiment, the ciphertext received from the client device may be a ciphertext encrypted using a homomorphic encryption algorithm.

Thereafter, the apparatus 110 for data analysis generates an encrypted calculation result for the remaining operations of the plurality of operations for performing the algorithm based on the target data by using the acquired ciphertext (420).

In this case, according to one embodiment, the apparatus 110 for data analysis may generate a ciphertext for the result of applying the remaining operations to the precomputation result by performing the homomorphic operation for the remaining operations using the acquired ciphertext.

Moreover, according to one embodiment, when the analysis algorithm includes a plurality of sub-algorithms each including one or more operations and the ciphertext received from the client device 120 is a ciphertext obtained by encrypting the result of performing some of the plurality of sub-algorithms, the apparatus 110 for data analysis may generate a ciphertext for the result of performing the remaining sub-algorithms of the plurality of sub-algorithms through the homomorphic operation using the received ciphertext.

Hereinafter, an example of performing a decision tree algorithm, which is one type of machine learning algorithm, according to one embodiment of the present invention will be described.

The decision tree algorithm aims to organize features, which best predict a label of any unlabeled data, into tree-structured questions by using a pair of data as training data, wherein the pair of data consists of a feature value representing a feature of data and a label representing a result value of classification of the data.

Specifically, in the decision tree algorithm, training data is classified based on each feature of the training data and a tree model is generated starting from a root node in the order in which labels are well classified. In this case, as the measure for determining whether a label is well classified, Gini Index indicating impurity, or information gain using entropy indicating uncertainty is used.

On the other hand, in a method of constructing a tree model, a range of a feature value that can be included in training data may be divided into a plurality of sections and then the training data is classified into one of the plurality of sections. For example, consider a case in which training data includes a feature of "age" that indicates the current age and a feature value of the corresponding feature ranges from 0 to 100. In this case, the training data is classified based on answers to the following questions in order starting from a root node and each classification result is evaluated through Gini index or the like.

Age $\leq 10$?
Age $\leq 20$?
Age $\leq 30$?
Age $\leq 40$?
Age $\leq 50$?
Age $\leq 60$?
Age $\leq 70$?
Age $\leq 80$?
Age $\leq 90$?
Age $\leq 100$?

Figure 5:
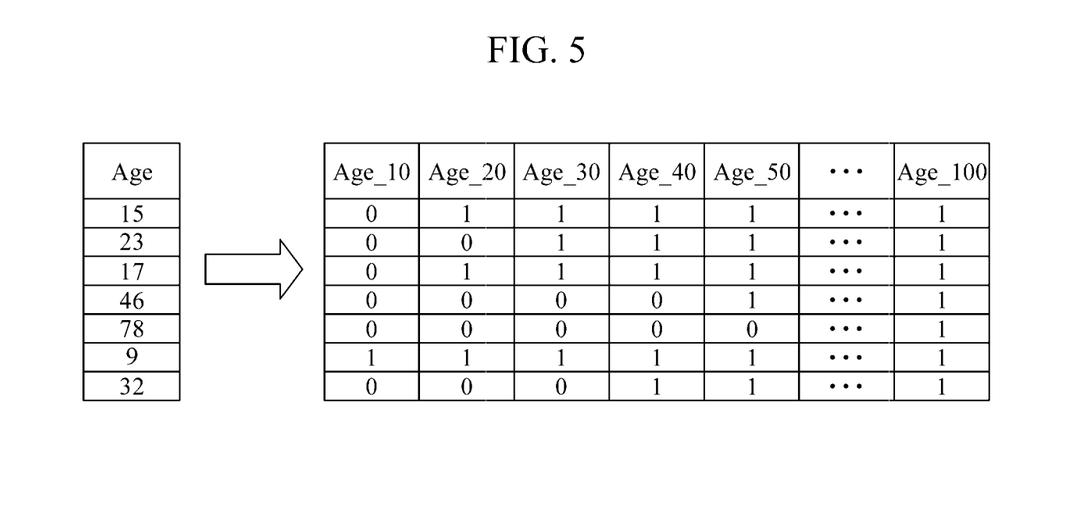
FIGS. 5 to 7 are diagrams for describing an example of an operation that can be performed in a client device according to one embodiment.

In order to obtain the answers to the aforementioned questions, a comparison operation between a reference value of each question and a feature value is required to be performed. However, a homomorphic operation for the comparison operation is generally an inefficient operation for which a bootstrapping operation has to be performed once or more. Therefore, as shown in the example illustrated in FIG. 5, the client device 120 may perform a pre-processing algorithm to perform conversion into binary data that represents the section to which the feature value for the feature of "age" of the target data belongs through the comparison operation, and then encrypt the converted binary data and provide the encrypted binary data to the apparatus 110 for data analysis. In this case, the apparatus 110 for data analysis may use a ciphertext for the converted binary data in an encrypted state to perform a homomorphic operation for the remaining operations of the decision tree algorithm.

Figure 6:
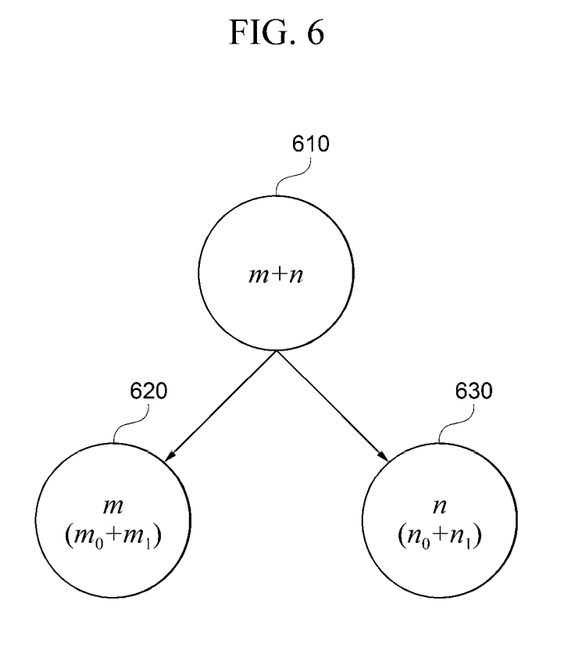

In another example, consider a case in which each node in the tree model branches out as shown in an example illustrated in FIG. 6.

Specifically, in the example illustrated in FIG. 6, a parent node 610 has a total of m+n samples, and m samples of the m+n samples are assigned to the left child node 620 and n samples are assigned to the right child node 630. Meanwhile, among the m samples assigned to the left child node 620, there are $m_0$ samples having a label value of 0 and mi samples having a label value of 1. In addition, among the n samples assigned to the right child node 630, there are no samples having a label value of 0 and $n_1$ samples having a label value of 1.

In the example shown in FIG. 6, the Gini index may be calculated as shown in Equation 4 below.

$$\frac{m}{m+n} \cdot \left(1 - \left(\frac{m_0}{m}\right)^2 - \left(\frac{m_1}{m}\right)^2\right) + \frac{n}{m+n} \cdot \left(1 - \left(\frac{n_0}{n}\right)^2 - \left(\frac{n_1}{n}\right)^2\right) = \frac{2m_0 m_1}{(m+n)m} + \frac{2n_0 n_1}{(m+n)n} \quad \text{[Equation 4]}$$

As can be seen in Equation 4, in order to calculate the Gini index, it is necessary to calculate an inverse number of each of (m+n)m and (m+n)n. For a homomorphic operation for this calculation, a method of performing a homomorphic operation on an approximate value of the inverse number using an approximation may be used. However, the homomorphic operation using such an approximation is efficiently calculated only for values between 0 and 2. When, in order to bypass this drawback, the client device 120 divides a label value by N, which is the total number of samples, and then encrypts the result and provides the encrypted result to the apparatus 110 for data analysis, as shown in an example illustrated in FIG. 7, efficient calculation of an inverse number is possible through a homomorphic operation in the apparatus 110 for data analysis according to Equation 5 below.

$$\frac{\frac{2m_0}{N} \cdot \frac{m_1}{N}}{\left(\frac{m}{N} + \frac{n}{N}\right) \cdot \frac{m}{N}} + \frac{\frac{2n_0}{N} \cdot \frac{n_1}{N}}{\left(\frac{m}{N} + \frac{n}{N}\right) \cdot \frac{n}{N}} = = \frac{2m_0 m_1}{(m+n)m} + \frac{2n_0 n_1}{(m+n)n} \quad \text{[Equation 5]}$$

Figure 7:
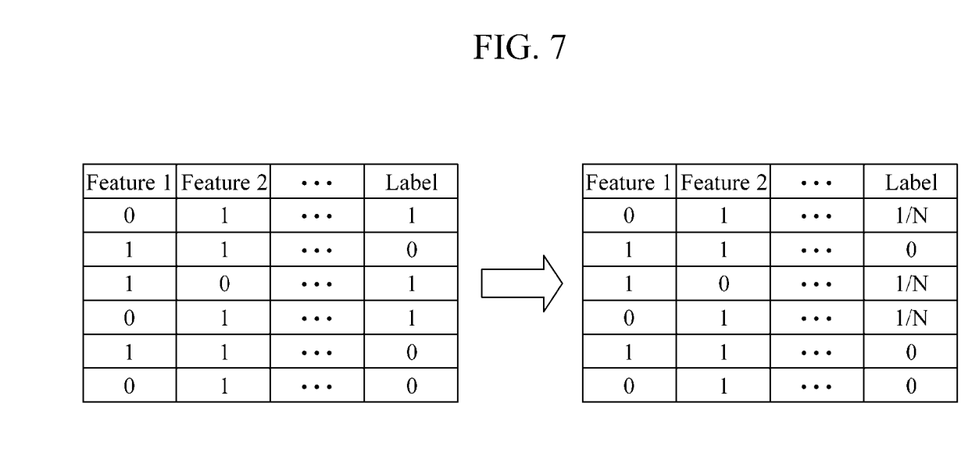

At this time, the homomorphic operation of multiplying the label value by a constant of 1/N is relatively efficient but the pre-calculation does not affect the result of performing the entire algorithm, and hence, when the client device 120 performs the operation of multiplying the label value by the constant of 1/N, then encrypts the result, and provides the encrypted result to the apparatus 110 for data analysis, the time of performing the entire algorithm can be reduced.

Figure 8:
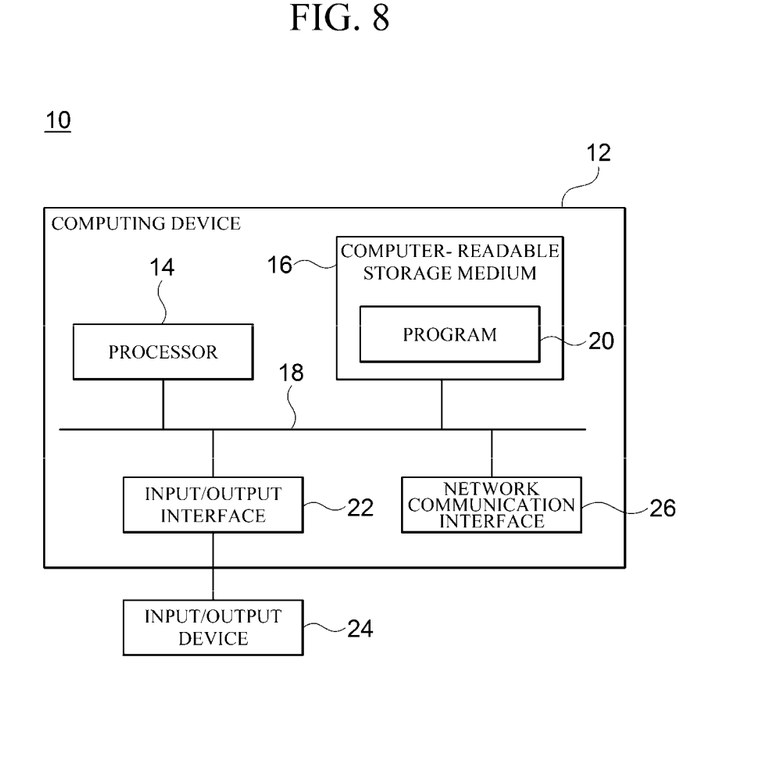
FIG. 8 is a block diagram for describing an example of a computing environment including a computing device suitable for use in exemplary embodiments.

FIG. 8 is a block diagram for describing an example of a computing environment including a computing device suitable for use in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in the apparatus 110 for data analysis illustrated in FIG. 2.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

While representative embodiments of the preset invention have been described above in detail, it may be understood by those skilled in the art that the embodiments may be variously modified without departing from the scope of the present invention. Therefore, the scope of the present invention is defined not by the described embodiment but by the appended claims, and encompasses equivalents that fall within the scope of the appended claims.

The invention claimed is:

1. A method for data analysis performed by an apparatus for data analysis, comprising:
   acquiring, from a client device, a ciphertext for a precomputation result generated by applying some of a plurality of operations for performing an analysis algorithm based on target data to the target data; and
   generating an encrypted computation result for remaining operations of the plurality of operations by using the ciphertext,
   wherein the analysis algorithm includes a plurality of sub-algorithms each including one or more operations among the plurality of operations;
   in the client device, the precomputation result is generated by dividing the target data into a plurality of parts and then performing some of the plurality of sub-algorithms on one or more of the plurality of parts; and
   in the apparatus for data analysis, the encrypted computation result is a ciphertext for a result of performing remaining sub-algorithms of the plurality of sub-algorithms using the ciphertext.

2. The method of claim 1, wherein the ciphertext for the precomputation result is a ciphertext encrypted using a homomorphic encryption algorithm.

3. The method of claim 2, wherein the generating comprises generating the encrypted computation result by performing a homomorphic operation for the remaining operations using the ciphertext.

4. The method of claim 1, wherein the some of the plurality of operations include at least one of a multiplication operation and a comparison operation based on the target data.

5. An apparatus for data analysis, comprising:
   a ciphertext acquirer configured to acquire, from a client device, a ciphertext for a precomputation result generated by applying some of a plurality of operations for performing an analysis algorithm based on target data to the target data; and
   a computation unit configured to generate an encrypted computation result for remaining operations of the plurality of operations by using the ciphertext,
   wherein the analysis algorithm includes a plurality of sub-algorithms each including one or more operations among the plurality of operations;
   in the client device, the precomputation result is generated by dividing the target data into a plurality of parts and then performing some of the plurality of sub-algorithms on one or more of the plurality of parts; and
   in the apparatus for data analysis, the encrypted computation result is a ciphertext for a result of performing remaining sub-algorithms of the plurality of sub-algorithms using the ciphertext.

6. The apparatus of claim 5, wherein the ciphertext for the precomputation result is a ciphertext encrypted using a homomorphic encryption algorithm.

7. The apparatus of claim 6, wherein the computation unit is further configured to generate the encrypted computation result by performing a homomorphic operation for the remaining operations using the ciphertext.

8. The apparatus of claim 6, wherein the some of the plurality of operations include at least one of a multiplication operation and a comparison operation based on the target data.

\* \* \* \* \*